United States Patent [19]
Ono et al.

[11] Patent Number: 5,243,483
[45] Date of Patent: Sep. 7, 1993

[54] ROTARY DRUM DEVICE

[75] Inventors: Hiroaki Ono, Mito; Tomomi Okamoto, Katsuta; Seiji Ono, Yokohama; Shinji Ozaki, Funabashi, all of Japan

[73] Assignee: Hitachi, Ltd., Tokyo, Japan

[21] Appl. No.: 741,626

[22] Filed: Aug. 7, 1991

[30] Foreign Application Priority Data

Aug. 10, 1990 [JP] Japan ................... 2-210354
Sep. 26, 1990 [JP] Japan ................... 2-254144

[51] Int. Cl.$^5$ ............................................. G11B 5/127
[52] U.S. Cl. .................................................. 360/118
[58] Field of Search ..................................... 360/118

[56] References Cited

U.S. PATENT DOCUMENTS 4,390,915  6/1983  Matsuyama .................. 360/84

FOREIGN PATENT DOCUMENTS 59-172101  9/1984  Japan .
61-105704  5/1986  Japan .
62-07605   1/1987  Japan .
88104      4/1987  Japan .

*Primary Examiner*—Craig E. Church
*Attorney, Agent, or Firm*—Fay, Sharpe, Beall, Fagan, Minnich & McKee

[57] ABSTRACT

This invention relates to a rotary drum device used in magnetic recording and playback apparatus such as VTRs, and particularly to the structure of a magnetic head and flying erasure head mounted on the rotary drum. The flying erasure head and recording head are of virtually same design, with the erasing frequency being set lower than the recording frequency with the intention of obliterating the old record instead of erasing it completely, and the flying erasure head has an azimuth angle of 0° and operates for erasing the old record at a frequency close to the maximum recording frequency of the apparatus, allowing the erasure of record of any particular channel. The flying erasure head and recording head of the virtually same shape reduce their manufacturing cost. The erasing frequency lower than the recording frequency effects the head isolation, and the flying erasure head can be mounted without special shielding measures against such defective performance as crosstalk. The old record can be erased or obliterated easily, and the signal imprinted by the flying erasure head is not picked up because of the azimuth loss. The erasing signal frequency within the recording frequency band causes little crosstalk.

9 Claims, 8 Drawing Sheets

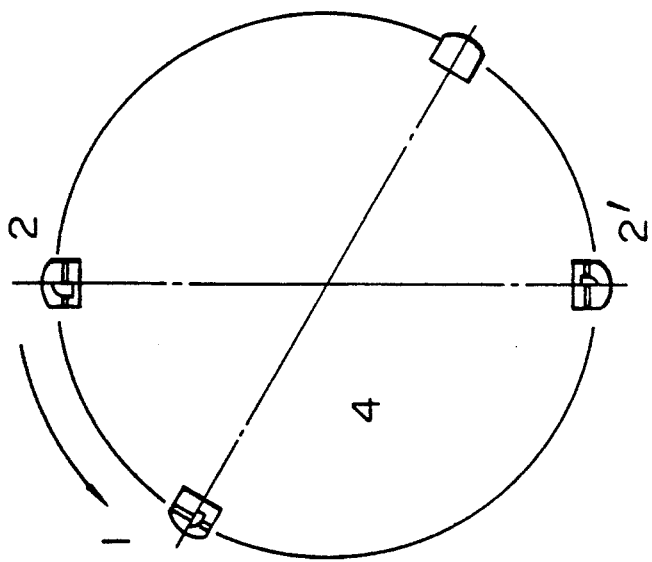
FIG. IA PRIOR ART
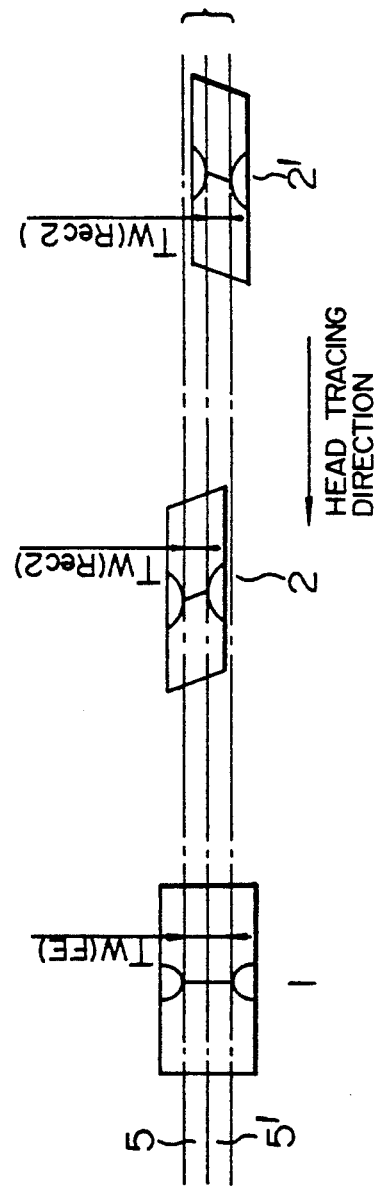
FIG. IB PRIOR ART

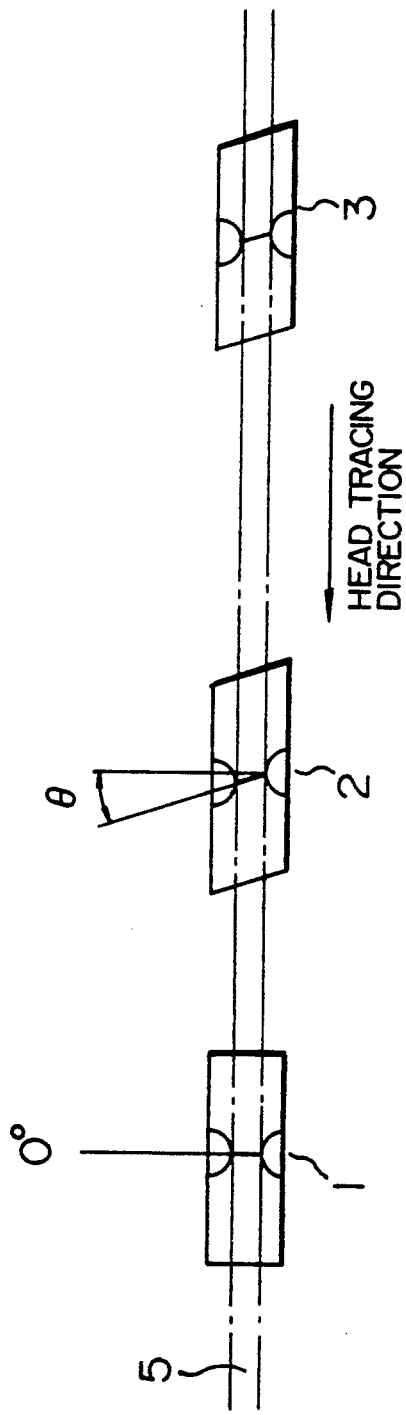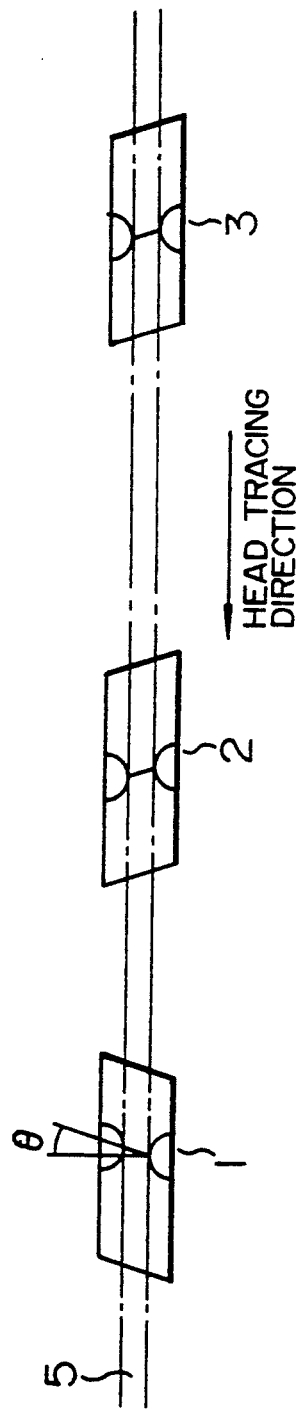

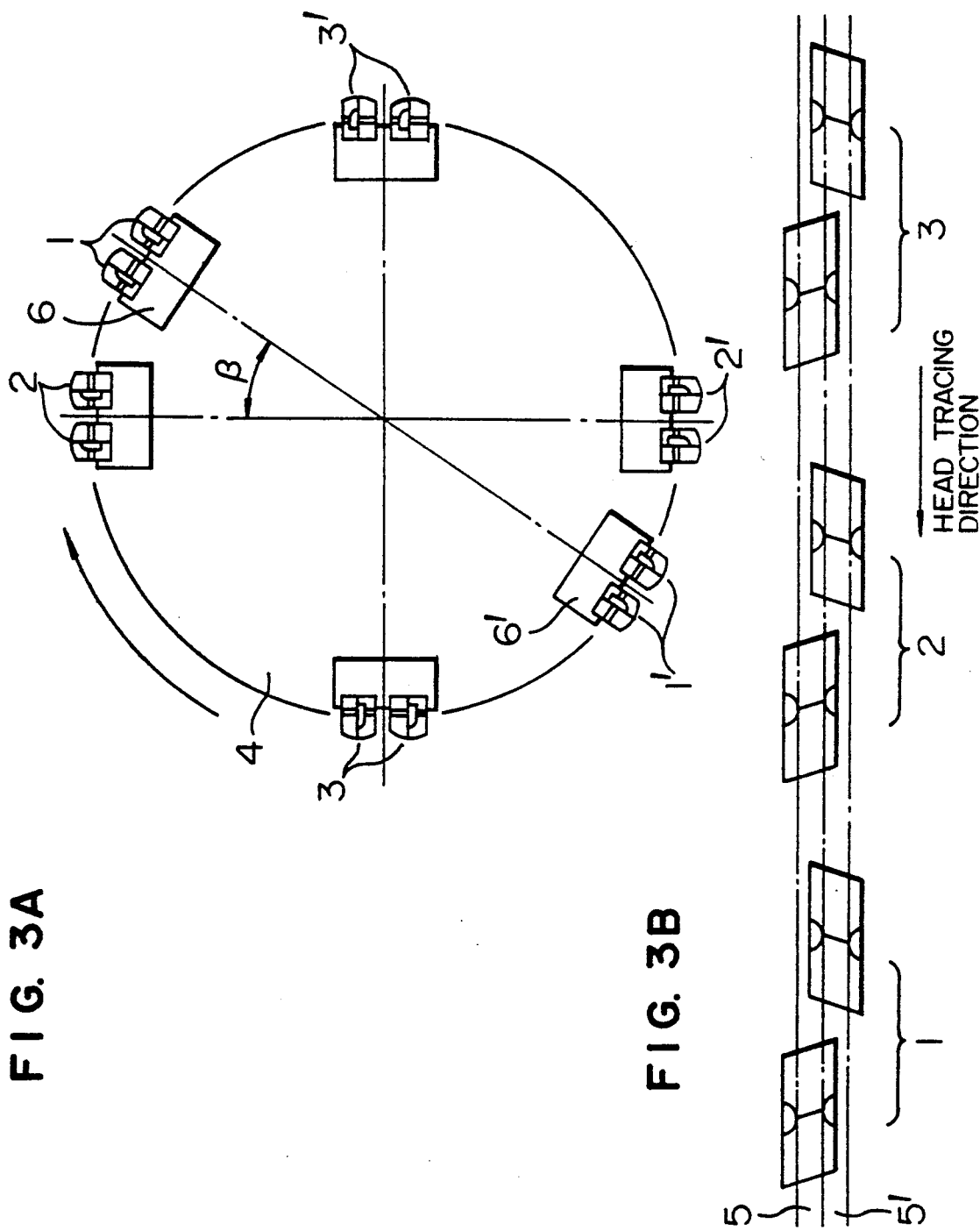

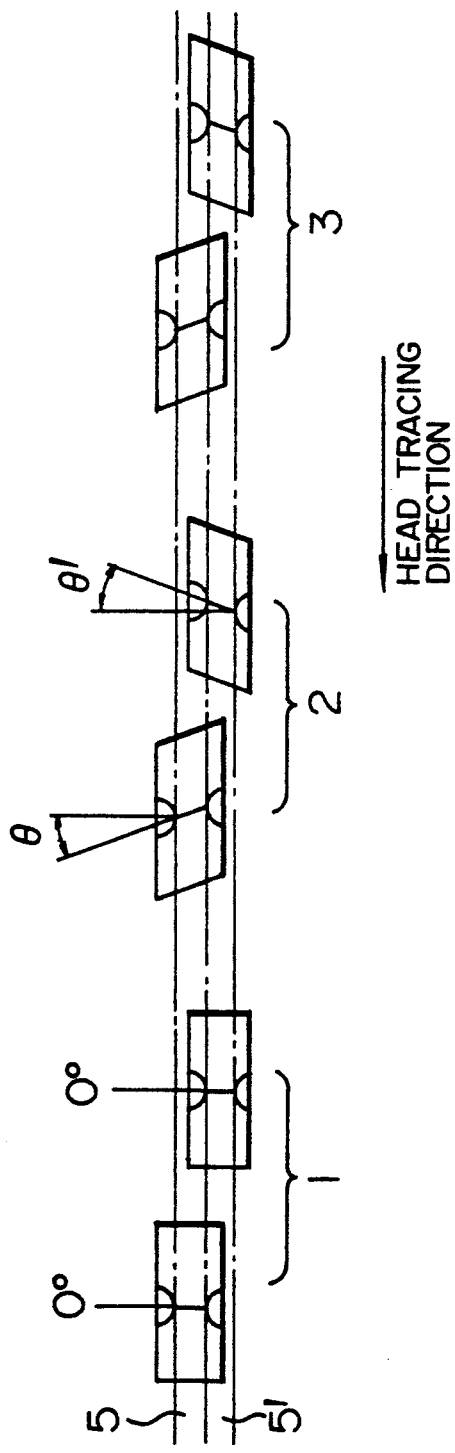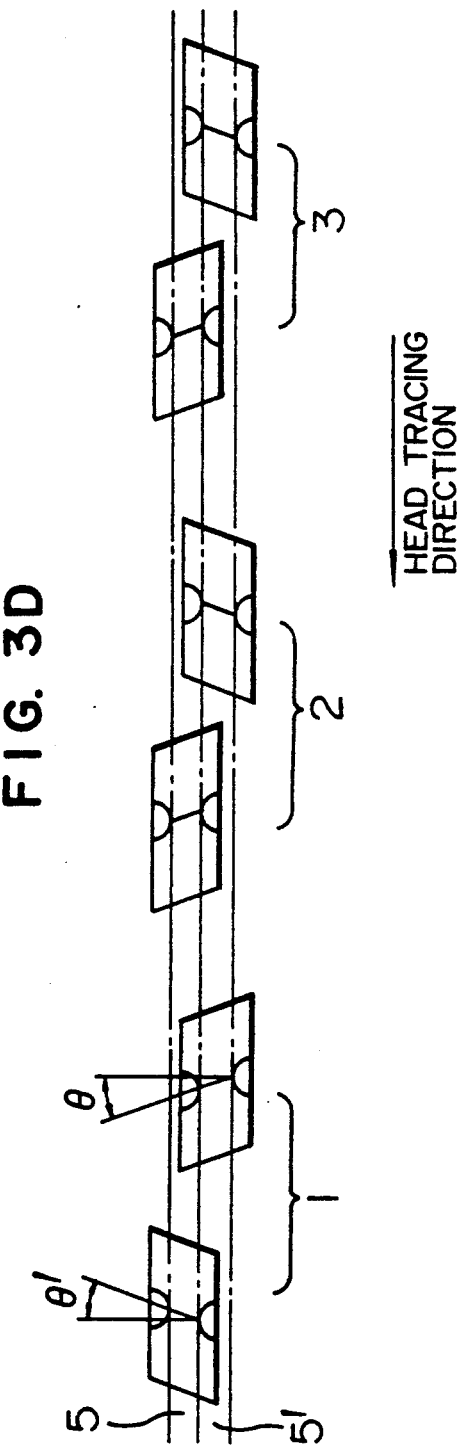

HEAD TRACING DIRECTION

HEAD TRACING DIRECTION

HEAD TRACING DIRECTION

ROTARY DRUM DEVICE

BACKGROUND OF THE INVENTION

This invention relates to a rotary drum device used in magnetic recording and playback apparatus such as VTRs, and particularly to the structure of a magnetic head and flying erasure head mounted on the rotary drum, and the method of mounting the heads on the rotary drum.

Many commercially available VTRs with edit functions incorporate a flying erasure head, which is a rotary erasing head operating in advance of the recording head to clean the seam section between an already recorded signal and a signal that is about to be recorded by erasing the old record, with the intention of ensuring a high picture quality while retaining the inherent edit function, as described in Japanese Utility Model Publication No. 62-7605, for example.

FIGS. 1A and 1B are diagrams showing the disposition of VTR heads including a flying ensure head 1 and the positional relation of the heads on recording tracks 5 and 5' based on the conventional VTR system. Because of analog recording adopted by many conventional VTR systems, recording (playback) heads 2 and 2' having different azimuth angles are disposed at positions of 180° confrontation, as shown in FIG. 1A, so that a field of picture is formed by a revolution of one head on the rotary drum 4, i.e., a frame of picture is formed by two heads in one revolution of drum. In analog recording, the old record is erased for each frame of picture, instead of each field, and the flying erasure head 1 needs to erase two tracks in one revolution as shown in FIG. 1B by having a tracking width $T_{W(FE)}$ expressed as follows.

$$T_{W(FE)} \simeq T_{W(Rec2)} + T_{W(Rec2')} \quad (1)$$

where $T_{W(Rec2)}$ is the tracking width of recording (playback) head 2, and $T_{W(Rec2')}$ is the tracking width of recording (playback) head 2'.

Since the flying erasure head needs to erase two tracks of different azimuth angles simultaneously, it must have the azimuth angle set to the mean value of azimuth angles of the two recording tracks in consideration of the azimuth loss of the erasing signal. The flying erasure head 1 has the role of complete erasure of the old record, operating at an erasing frequency higher than the maximum recording frequency of the VTR system, with its wavelength being in the record demagnetization region, and therefore it has a gap length twice or more the gap length of the recording heads 2 and 2'.

The combination of the flying erasure head and recording heads based on the above-mentioned prior art is not intended for erasure of only one channel or a partial recording track on a track, which is required in digital-recording VTRs, for example. The higher erasing frequency of a large erasing current supplied to the flying erasure head will incur the head isolation problem when the recording frequency will be raised for increased recording density. Because of the completely different flying erasure head from the recording head in the conventional VTR system, they need different fabricating processes, resulting in a high manufacturing cost as the whole system.

Moreover, the long-gap head involves such problems as: (1) the gap section is prone to be decorticate and difficult to fabricate, (2) the gap edge section has an increased fringe effect to produce an increased actual erasing tracking width relative to the head tracking width. These problems jeopardize the adoption of long-gap head in a coming narrow-track VTR system.

A further problem of the conventional flying erasure head is crosstalk with another channel in such a system as a digital VTR, which deals with a recording frequency as high as several tens megahertz for extremely high transfer rate, where much higher erasing frequency is required. On this account, mounting a flying erasure head necessitates special head isolation measures at the stage of design.

SUMMARY OF THE INVENTION

A prime object of this invention is to provide a flying erasure head which erases only a partial recording track on a track and a rotary drum device which mounts the head.

Another object of this invention is to provide a flying erasure head which does not need a special electromagnetic shield against such defective performance as crosstalk when mounted on the rotary drum.

A further object of this invention is to reduce the manufacturing cost of the flying erasure head and recording head.

A further another object of this invention is to remove dusts on the recording tape surface by tracing the tape with the flying erasure head in advance of the recording head.

In order to achieve the above objectives, the inventive flying erasure head is designed to be virtually identical to the recording head, with its erasing frequency being set lower than the recording frequency so that the old record is obliterated instead of being erased completely. The flying erasure head has its azimuth angle set to 0° and operates to erase the old record at a frequency close to the highest recording frequency of the VTR system.

As a result of identical design of the flying erasure head and recording head, it becomes possible to erase the old record of any particular channel. The use of the flying erasure head and recording head of the same shape allows the reduction of manufacturing cost of the VTR system. The erasing frequency set lower than the recording frequency effects the electromagnetic isolation, and the flying erasure head can be mounted on the rotary drum without the need of special shielding measures against such defective performance as crosstalk.

Conventionally, the recording head performs azimuth recording in order to avoid a crosstalk from the adjacent track. Whereas, by setting a 0° azimuth angle or an opposite azimuth angle for the flying erasure head and an erasing signal frequency close to the maximum recording frequency of the recording head, the old record can be erased or obliterated, and the signal imprinted by the flying erasure head is not picked up due to the azimuth loss. In addition, the erasing signal within the recording frequency band causes little crosstalk.

BRIEF DESCRIPTION OF THE DRAWINGS

Preferred embodiments of the present invention will now be described in connection with the accompanying drawings, of which:

FIGS. 1A and 1B are diagrams showing the disposition of magnetic heads on the rotary drum and the tape surface based on the conventional VTR system;

FIG. 2C is a diagram showing the tape surface pertinent to the rotary drum device based on the second embodiment of this invention;

FIG. 2D is a diagram showing the tape surface pertinent to the rotary drum device based on the third embodiment of this invention;

FIGS. 3A and 3B are diagrams showing the disposition of heads on the rotary drum and the tape surface based on the fourth embodiment of this invention;

FIG. 3C is a diagram showing the tape surface pertinent to the rotary drum device based on the fifth embodiment of this invention;

FIG. 3D is a diagram showing the tape surface pertinent to the rotary drum device based on the sixth embodiment of this invention;

DESCRIPTION OF THE PREFERRED EMBODIMENTS

The rotary drum device based on the first embodiment of this invention will be described with reference to FIGS. 2A and 2B.

Figure 2A:
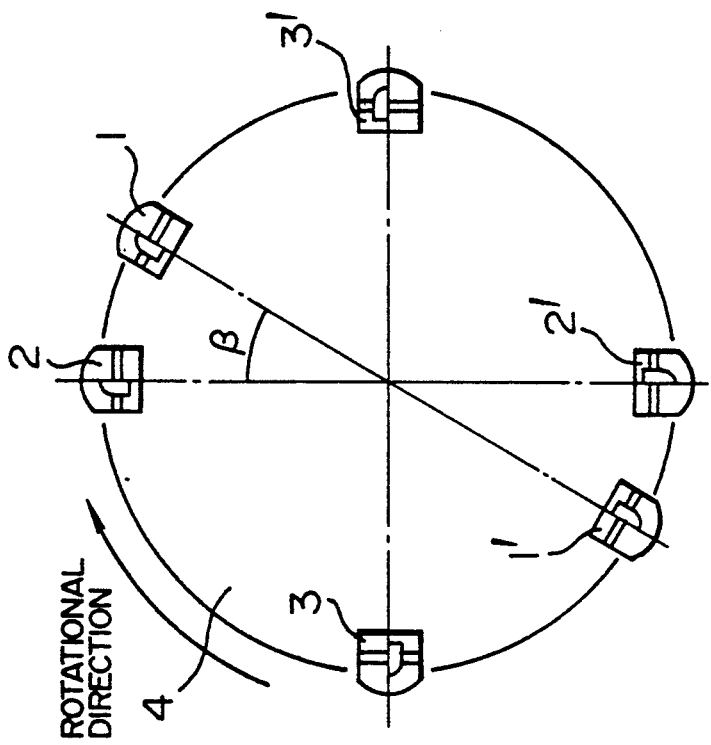
FIGS. 2A and 2B are diagrams showing the disposition of heads on the rotary drum and the tape surface based on the first embodiment of this invention.

FIG. 2A shows the disposition of six heads on a rotary drum 4 of the separated recording/playback system. The six heads are recording heads 2 and 2' for two channels, playback heads 3 and 3' for two channels, and flying erasure heads 1 and 1' for two channels.

Figure 2B:
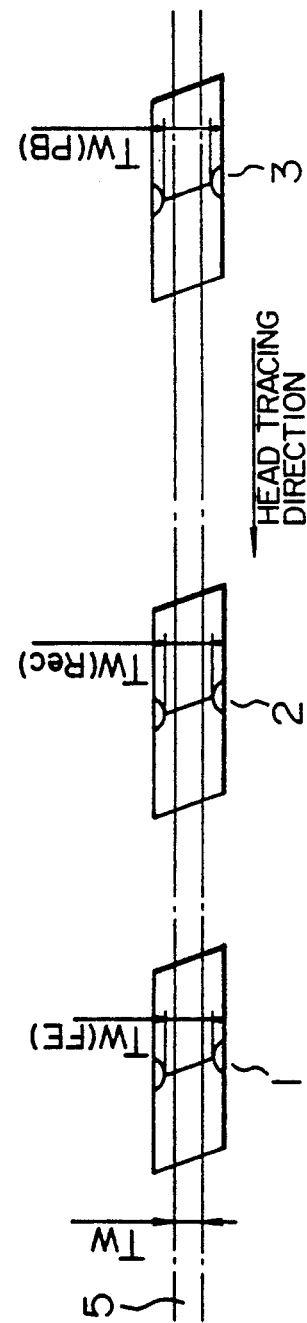

FIG. 2B shows tracing of the flying erasure head 1, recording head 2 and playback head 3 on the same track 5. Other heads 1', 2' and 3' have opposite azimuths with respect to the heads 1, 2 and 3, respectively. The track is traced by these heads in the order of the flying erasure head 1, recording head 2 and playback head 3, so that initially the flying erasure head 1 erases the old record on the track, next the recording head 2 records a new signal on the track, and finally the playback head 3 traces the track thereby to verify recording. Although shown in FIG. 2A is the use of separate heads for recording and playback, a VTR system without the simultaneous monitoring function may employ common recording/playback heads.

According to the prior art shown in FIGS. 1A and 1B, the flying erasure head has its tracking width $T_{W(FE)}$ set twice or above the tracking width $T_{W(Rec)}$ of the recording head and operates to erase the record on two tracks or more. However, in the application of the VTR to a data recorder, it is often desirable to erase individual tracks independently, and this can be done by setting the tracking width $T_{W(FE)}$ virtually equal to the $T_{W(Rec)}$ so that the flying erasure head does not erase the adjacent track.

Practically, however, the tracking width of flying erasure head is determined in consideration of editing for tapes which have been recorded on different models of VTR, and of differences in the curving of track, the width of track and the position of track on the tape, and of overwriting for residual track portion which has not been erased by the flying erasure head. Accordingly, the $T_{W(FE)}$ is preferably set to meet the following conditions.

Refering to FIG. 2B, $$T_{W(Rec)} = T_{W(FE)} + \alpha \qquad (2)$$

where $\alpha$ ranges from $-0.3T_{W(Rec)}$ to $+0.3T_{W(Rec)}$ (3)

(ideally $\alpha = 0$)

With respect to the track width $T_W$, $$0.7T_W < T_{W(FE)} < 1.3T_W \qquad (4)$$

where
$T_W$—width of track trace
$T_{W(FE)}$—track width of flying erase head

FIG. 2B is the case where the flying erasure heads 1 and 1' and the recording heads 2 and 2' have virtually equal azimuth angles. Indicated by $T_{W(PB)}$ in FIG. 2B is the tracking width of the playback head.

However, the flying erasure head 1 is not confined to have this azimuth angle, but it may have a 0° azimuth angle $\theta$ as shown in FIG. 2C as the second embodiment of this invention. Alternatively, it may have an azimuth angle $\theta$ opposite to that of the recording head 2 as shown in FIG. 2D as the third embodiment of this invention.

General VTR systems having flying erasure heads are intended to perform a.c. erasure of the old record, and therefore their gap length $G_{lFE}$ are set twice or above the gap length $G_{lRec}$ of the recording head and their erasing frequency is set higher than the recording frequency. However, in the case of a data recorder or digital VTR having flying erasure heads, the heads may have a role of obliterating recorded data at most, instead of erasing the old record. Namely, in digital recording, the state of data which is never read out is equivalent to the erased state, and accordingly old data may be obliterated by overwriting a signal of a certain frequency so that reading of data results in error invariably. In this case, the flying erasure head can have a gap length virtually equal to that of the recording head, and both heads may even be of completely same design, allowing cost reduction. The erasing frequency can be selected within the recording frequency band and above 1 MHz. A specially large erasing current is not required, and the rotary drum is not required to have special isolation measures for mounting flying erasure heads, resulting in a further cost reduction. The flying erasure heads 1 and 1' also serve to wipe the tracks 5 and 5' of tape before the recording heads 2 and 2' record signals, preventing the recording heads from being contaminated with dusts. On this account, the flying erasure heads are mounted at positions ahead of the recording heads on the rotary drum 4. The erasing and recording heads are located as close as possible for the sake of the cleaning effect, with an angular spacing $\beta$ which meets the following condition being set in consideration of crosstalk.

$$10° \leq \beta \leq 45° \qquad (5)$$

Although FIG. 2A is the case where a single flying erasure head is placed on the head base, two or more flying erasure heads 1 and 1' for multiple channels may be placed on head bases 6 and 6' as shown in FIG. 3A as the fourth embodiment of this invention. In this case, an equal number of recording heads 2 and 2' and playback heads 3 and 3' are mounted for multiple channels. Although FIG. 3B is the case where the flying erasure heads 1 and 1', recording heads 2 and 2', and playback heads 3 and 3' trace the tracks 5 and 5' of the same azimuth, the flying erasure heads may have a 0° azimuth angle as shown in FIG. 3C as the fifth embodiment of this invention. The flying erasure heads may have opposite azimuth angles as shown in FIG. 3D as the sixth embodiment of this invention.

Figure 4A:
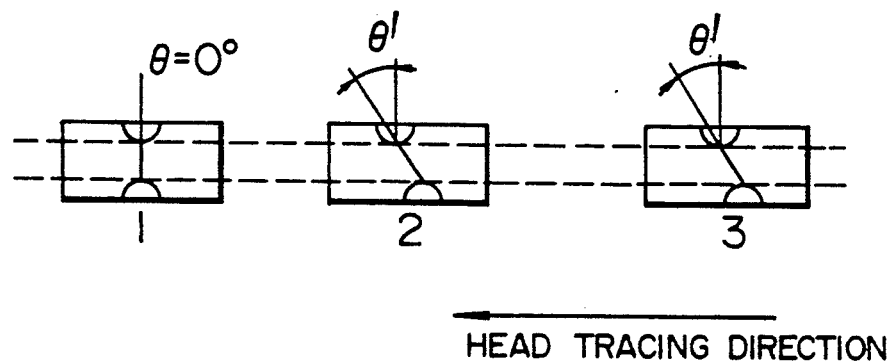
FIGS. 4A and 4B are diagrams showing the disposition of heads on the rotary drum and the tape surface based on the seventh embodiment of this invention.
Figure 4B:
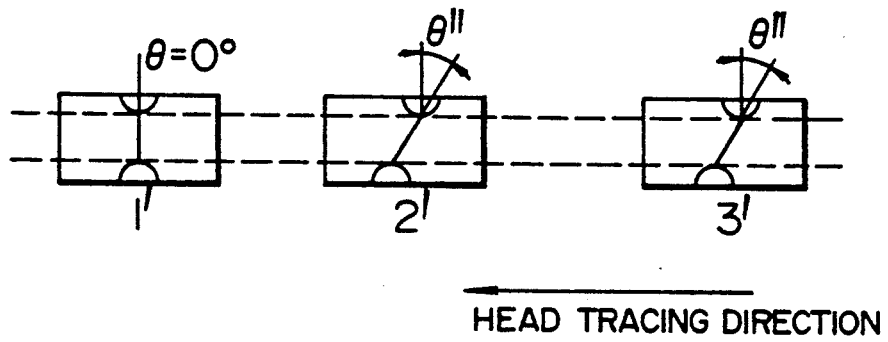

FIGS. 4A and 4B are diagrams showing the tape surface pertinent to the rotary drum device based on the seventh embodiment of this invention. As mentioned previously, shown in FIG. 2A is a separated recording/playback system having six heads which include recording heads 2 and 2' for two channels, playback heads 3 and 3' for two channels, and flying erasure heads 1 and 1' for two channels.

FIGS. 4A and 4B show tracing of the flying erasure heads 1 and 1', recording heads 2 and 2', and playback heads 3 and 3' shown in FIG. 2A on the same track. The heads 1', 2' and 3' have opposite azimuths with respect to the heads 1, 2 and 3, respectively. The track is traced by these heads in the order of the flying erasure head 1, recording head 2 and playback head 3, so that initially the flying erasure head 1 erases or obliterates the old record on the track, next the recording head 2 records a new signal on the track, and finally the playback head 3 traces the track thereby to verify recording. Although shown in FIG. 2A is the use of independent recording heads and playback heads, a VTR system without the monitor-at-recording function may employ common recording/playback heads. The prior art system performs a.c. erasure of the old record by having a gap length $G_{IFE}$ of flying erasure head set twice or above the gap length $G_{IRec}$ of recording head and having an erasing frequency set higher than the recording frequency. Digital VTRs or the like operating at high data transfer rates, require recording frequencies as high as several tens megahertz. On this account, if it is intended to erase recorded data based on the conventional scheme, the recording signal frequency will be extremely high, incurring crosstalk with other channel. Therefore, a rotary drum device mounting a flying erasure head will need special isolation measures. In such cases, the flying erasure head 1 is designed to have an azimuth angle $\theta$ as follows;

$$\theta = 0° \qquad (6)$$

The flying erasure head 1 operates for erasure at a frequency $f_{FE}$ which meets the following condition.

$$f_{FE} = \alpha \cdot f_{REC(max)} \qquad (7)$$

where $f_{REC(max)}$ is the maximum recording frequency of the VTR system, and $\alpha$ ranges as follows;

$$0.8 \leq \alpha \leq 1.2 \qquad (8)$$

Through the erasing operation based on the above conditions, the signal imprinted by the flying erasure head is not picked up by the playback head 3, and special measures against crosstalk are not required. For example, when a digital VTR mounts the above-mentioned flying erasure head, with the erasing frequency being set to 32 MHz, the difference in azimuth angle from the recording head being 15°, and the tracking width being 39 μm, then the azimuth loss will be −30 dB or less.

The head arrangement shown in FIG. 2A is one channel per track.

In dealing with an increased transfer rate, data is often recorded by being divided into multiple channels.

Figure 5A:
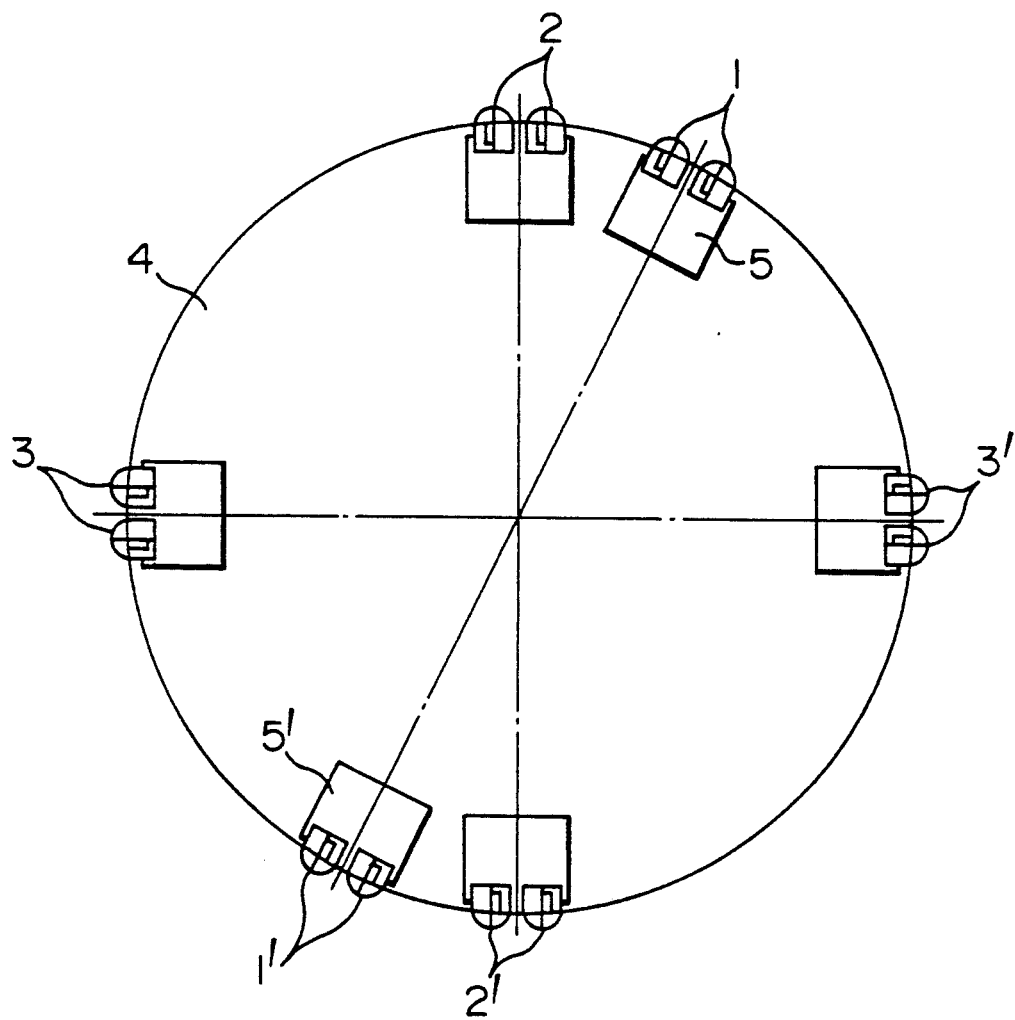
FIGS. 5A and 5B are diagrams showing the disposition of heads on the rotary drum and the tape surface based on the eighth embodiment of this invention.
Figure 5B:
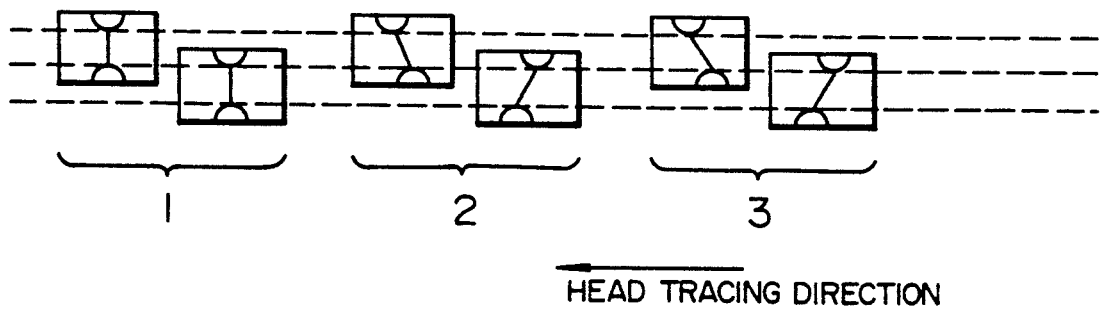

FIG. 5A shows the head disposition of a VTR system based on the eighth embodiment of this invention which is intended to record data through two-channel division. When a VTR is used as a data recorder, it is often desirable to erase tracks independently. In this case, flying erasure heads equal in number to recording heads are needed, and these flying erasure heads can be mounted on a common head base, as shown in FIG. 5B. Problems encountered generally in editing a tape which has been recorded on other VTR include the curving of track on the tape, the variation of tracking width of recording head, and the error of tracing position.

Figure 6:
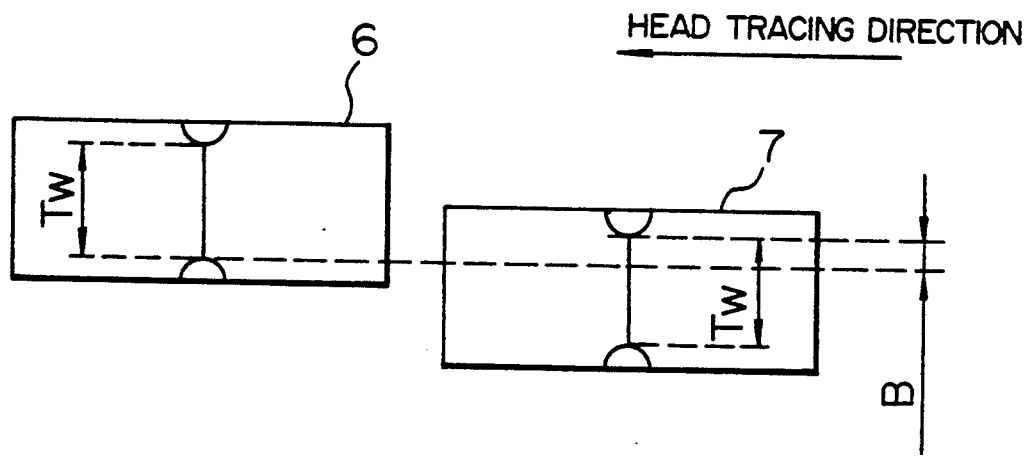
FIG. 6 is a diagram showing the tape surface pertinent to the rotary drum device of the eighth embodiment shown in FIG. 5A, with multi-channel flying erasure heads being disposed on a common head base on the rotary drum.

FIG. 6 shows the tape surface pertinent to the rotary drum device of FIG. 5A, with multi-channel flying erasure heads being disposed on a common head base. The multi-channel flying erasure heads have their offset $\beta$ and tracking width $T_W$ set as follows;

$$\beta \geq 0 \qquad (9)$$

$$T_W = P + X \qquad (10)$$

where P is the track pitch on the tape, and $\beta \leq X \leq 2\beta$.

In FIG. 6, indicated by 6 is a preceding flying erasure head, and 7 is a following flying erasure head.

These flying erasure heads are not intended for the generally used a.c. erasing operation. Therefore, their gap length $G_{l(FE)}$ is not required to be much greater than the gap width $G_{l(REC)}$ of the recording head, and it is set to meet the following condition.

$$G_{l(FE)} = \gamma G_{l(REC)} \qquad (11)$$

where $0.7 \leq \gamma \leq 1.8$.

The present invention achieves the following effectiveness.

(1) The ability of erasing any particular track is advantageous to meet the demand of erasing only partial data on a track in such applications as data recorders.

(2) The flying erasure heads and recording heads of virtually same design, and thus their similar fabricating processes, enable cost reduction.

(3) The erasing frequency set within the recording frequency band effects the head isolation, and the flying erasure heads can be mounted without the provision of a special electromagnetic shield against such defective performance as crosstalk.

(4) The flying erasure head tracing in advance of the recording head is advantageous to remove dusts on the tape.

We claim:

1. A rotary drum device on which are mounted separately and independently a recording or recording and playback magnetic head and a flying erasure head for erasing or obliterating a record on a magnetic tape, wherein said recording or recording and playback magnetic head and said flying erasure head have their tracking widths $T_{W(Rec)}$ and $T_{W(FE)}$, respectively, relates to each other as:

$$T_{W(Rec)} = T_{W(FE)} + \alpha$$

where $\alpha$ ranges from $-0.3T_{W(Rec)}$ to $+0.3T_{W(Rec)}$, and said recording or recording and playback magnetic head and said flying erasure head have their gap lengths $G_{l(Rec)}$ and $G_{l(FE)}$ respectively, related to each other as:

$$G_{l(FE)} = \gamma G_{l(REC)}$$

where $1 < \gamma \leq 1.8$.

2. A rotary drum device according to claim 1, wherein said recording or recording and playback magnetic head and said flying erasure head have virtually equal azimuth angles.

3. A rotary drum device according to claim 1, wherein said recording or recording and playback magnetic head and said flying erasure head have opposite azimuth angles.

4. A rotary drum device according to claim 1, wherein said flying erasure head comprises two or more flying erasure heads for multiple channels mounted on a same head base.

5. A rotary drum device according to claim 1, wherein said recording or recording and playback magnetic head and said flying erasure head are disposed with a spacing in terms of the rotational angle in the range from 10° to 45°.

6. A rotary drum device according to claim 1, wherein said flying erasure head is supplied with an erasing current having a frequency $f_{FE}$ which is related to the maximum recording frequency $f_{Rec(max)}$ as:

$$1 \leq f_{FE} \leq f_{Rec(max)}.$$

7. A rotary drum device according to claim 1, wherein said flying erasure head has its azimuth angle set to 0° approximately, and said flying erasure head is supplied with an erasing current having a frequency $f_{FE}$ which is related to the maximum recording frequency $f_{Rec(max)}$ as:

$$F_{FE} = \alpha \cdot f_{Rec(max)}$$

where $0.8 \leq \alpha \leq 1.2$.

8. A rotary drum device according to claim 1, wherein said flying erasure head comprises flying erasure heads for two channels or more on a same head base, with a preceding flying erasure head and a following flying erasure head having a head offset $\beta$ set greater than or equal to zero, and with said flying erasure heads having a tracking width $T_W$ set in relation with the track pitch P on the tape as:

$$T_W = P + X$$

where $\beta \leq X \leq 2\beta$.

9. A rotary drum device for a digital recording VTR, comprising a plurality of magnetic heads disposed for scanning a magnetic tape to record or reproduce digital signals; and, a plurality of flying erasure heads mounted on a rotary drum for obliterating old recorded data instead of perfectly erasing said old recorded data, said flying erasure heads having a gap length such that $$G_{l(FE)} = \gamma \cdot G_{l(Rec)}$$

where $1 < \gamma \leq 1.8$.

* * * * *